J. A. VOLK, Jr.
CENTRIFUGAL SWITCH.
APPLICATION FILED OCT. 11, 1911.
1,031,893.
Patented July 9, 1912.
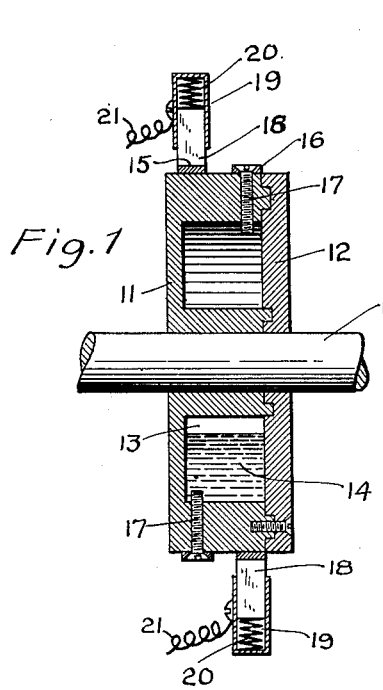
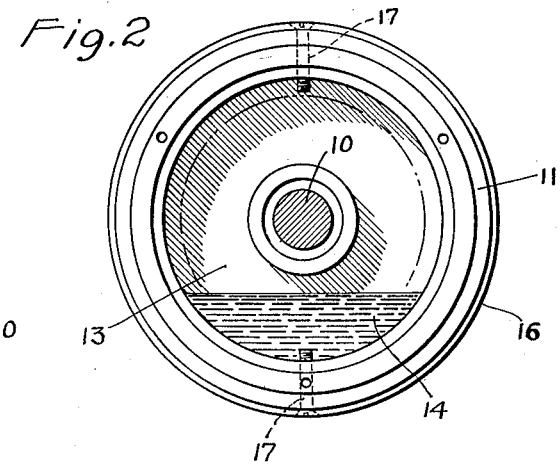
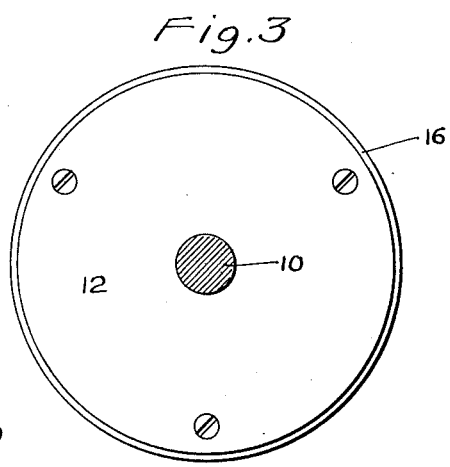
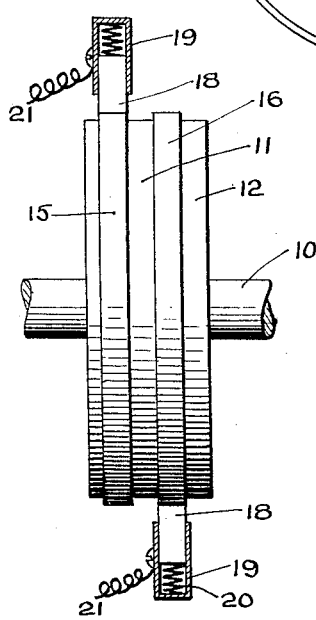
WITNESSES:
H. W. Meade
S. W. Atherton.
INVENTOR
Joseph A. Volk Jr.
BY
A. W. Wooster
ATTORNEY

UNITED STATES PATENT OFFICE.

JOSEPH A. VOLK, JR., OF SOUTH NORWALK, CONNECTICUT.

CENTRIFUGAL SWITCH.

1,031,893.  Specification of Letters Patent.  Patented July 9, 1912.

Application filed October 11, 1911. Serial No. 654,140.

*To all whom it may concern:*

Be it known that I, JOSEPH A. VOLK, Jr., a citizen of the United States, residing at South Norwalk, county of Fairfield, State of Connecticut, have invented an Improvement in Centrifugal Switches, of which the following is a specification.

This invention has for its object to provide an automatic centrifugal switch adapted for general use wherever short circuiting is required, as for instance to stop a clock by electrical connections when a shaft stops or starts, and in starting an alternating current motor and which is especially adapted for use upon motor cars using a storage battery and generator to permit current to pass from the generator to the storage battery when the generator is running and to open the circuit and prevent exhaustion of the storage battery when the generator stops.

With these and other objects in view I have devised the novel centrifugal switch which I will now describe, referring to the accompanying drawing forming a part of this specification and using reference characters to indicate the several parts.

Figure 1 is a section of my novel switch showing the brushes in place; Fig. 2 an elevation of the case with the cover plate removed; Fig. 3 an elevation of the cover plate detached; and Fig. 4 is an edge view of the switch as in use.

10 denotes the shaft and 11 a casing made of any suitable insulating material, as fiber, which is rigidly secured thereto as by a drive fit and is provided with a cover plate 12 secured in place by screws or in any suitable manner. The casing is provided with a circular recess 13 which is partly (less than half) filled with mercury, indicated by 14. Surrounding the periphery of the casing are two collector rings, indicated by 15 and 16. These rings fit closely and each ring is secured to the casing by a screw 17 which passes through the ring and through the peripheral wall of the casing and projects into the circular recess.

18 denotes brushes, ordinarily of copper, which are partly recessed in current-carrying sockets 19 which are rigidly secured in place in any suitable manner. Springs 20 within the sockets act to force the brushes forward and retain them in close engagement with the collector rings. 21 denotes current wires connected to the sockets.

The operation is as follows: In Fig. 1, the shaft and casing are at rest and the mercury of course lies at the bottom of the recess as shown, and current cannot pass from one collector ring to the other. As soon as the shaft and casing commence to rotate, however, centrifugal force will cause the mercury to line the inner peripheral wall of the recess and consequently to contact with both screws 17, thus establishing an electric connection between the two collector rings and through the brushes and sockets to the current wires, so that, for example, if used between a generator and a storage battery on a motor car, current will pass freely through the switch to the storage battery. Should the shaft and casing cease to rotate, however, the mercury will drop down into the bottom of the recess, as in Fig. 1, and the circuit will be opened, this for the reason that the quantity of mercury is always small enough so that it is impossible for but one of the screws 17 to contact with mercury when the shaft and casing are at rest, it being of course immaterial if the casing should stop in a position to leave both screws out of contact with the mercury.

Having thus described my invention I claim:

1. A switch of the character described comprising an insulating casing, mercury within said casing, two collector rings on the periphery thereof and a screw passing through each ring and extending into the casing so that when the casing is rotated centrifugal force will cause the mercury to contact with each screw and establish electrical connection between the rings.

2. A switch of the character described comprising an insulating casing, mercury within said casing, two collector rings on the periphery thereof and means for establishing electrical connection between the rings through the mercury when the switch is rotated.

3. A switch of the character described comprising an insulating casing, mercury within said casing, two collector rings on the periphery thereof, a screw passing through each ring and extending into the casing and brushes engaging the rings.

4. A switch of the character described comprising an insulating casing having a hub for engaging a shaft and a circular recess, mercury within said recess, two collector rings on the periphery of the casing and a screw passing through each ring and extending into the casing, substantially as described, for the purpose specified.

5. A switch of the character described comprising an insulating casing having a circular recess, a quantity of mercury less than half filling said recess, two collector rings on the periphery of the casing and a screw passing through each ring and extending into the casing, so that when the casing is rotated the mercury will contact with both screws and when the casing is stationary the mercury can contact with one screw only.

In testimony whereof I affix my signature in presence of two witnesses.

JOSEPH A. VOLK, Jr.

Witnesses:
 EDWARD B. SMITH,
 FRANK T. BRUNDAGE.